March 20, 1951 R. L. EDWARDS 2,545,608
REVERSIBLE SEAT BACK AND ARMREST STRUCTURE
Filed Jan. 15, 1949 2 Sheets-Sheet 1
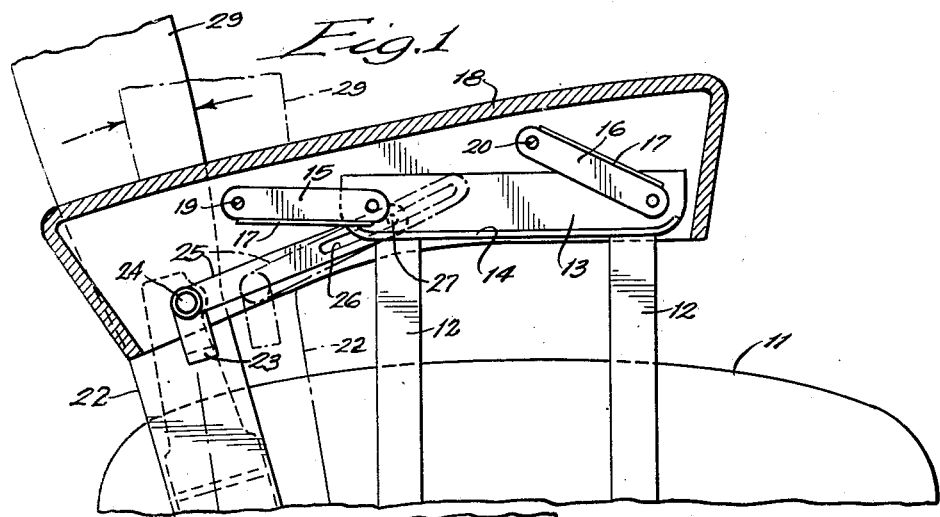
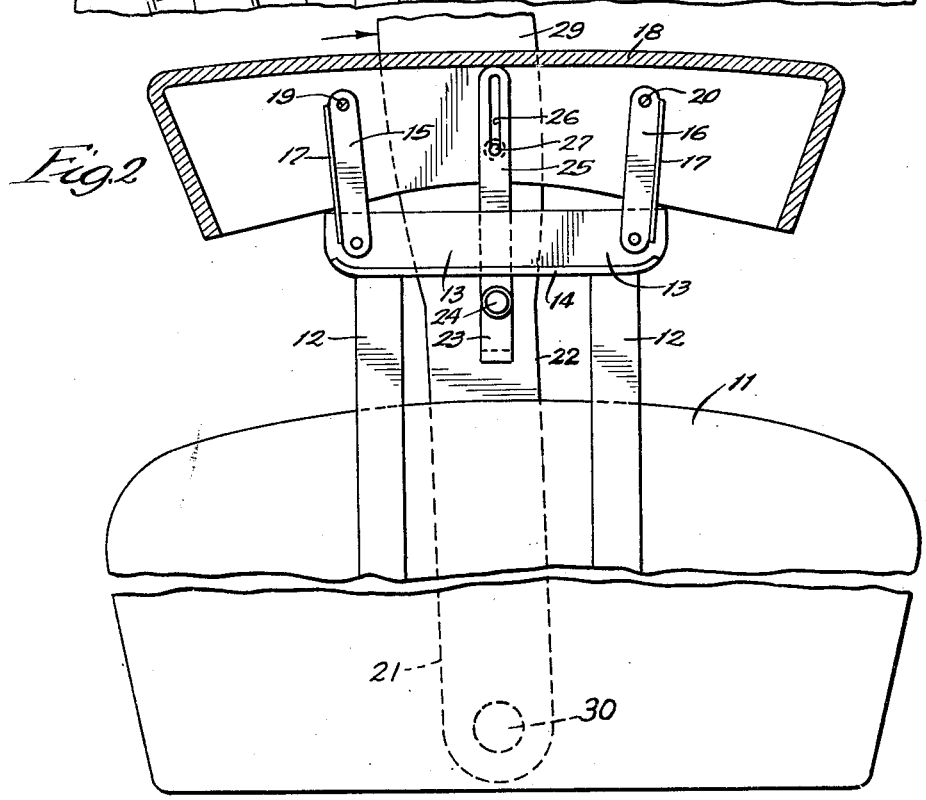
INVENTOR:
Robert Louis Edwards.
BY Dawson, Ooms, Brothers Spangenberg,
ATTORNEYS.

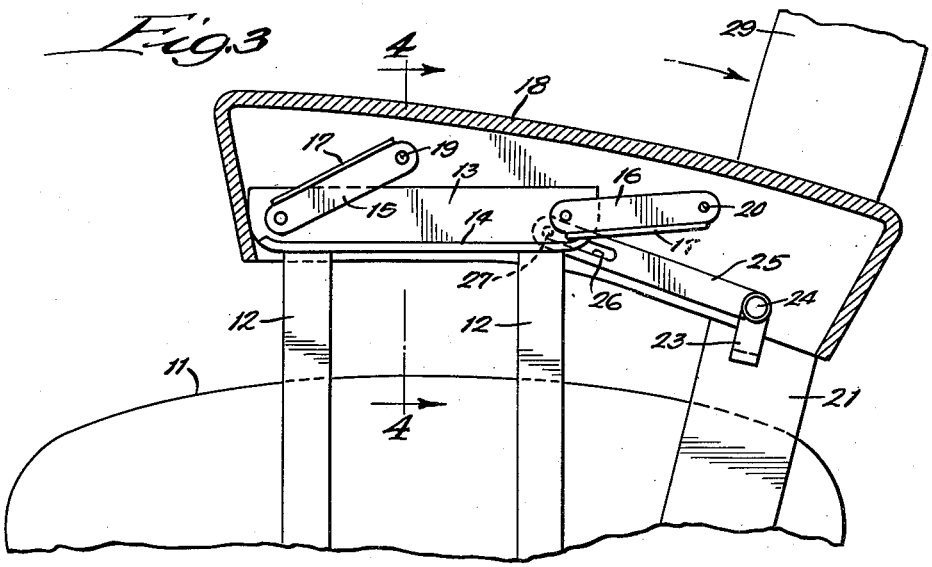
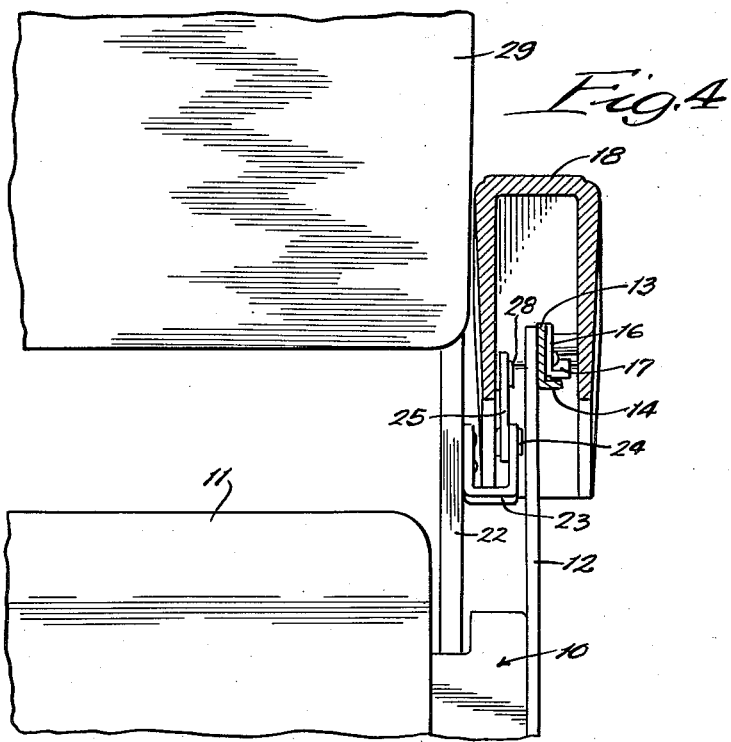

Patented Mar. 20, 1951

2,545,608

UNITED STATES PATENT OFFICE 2,545,608

REVERSIBLE SEAT BACK AND ARMREST STRUCTURE

Robert Louis Edwards, Oak Park, Ill., assignor to S. Karpen & Bros., Chicago, Ill., a corporation of Illinois Application January 15, 1949, Serial No. 71,086

7 Claims. (Cl. 155—101)

This invention relates to a reversible seat back and arm rest structure and is particularly useful for railway cars, tram cars, buses, and similar types of transportation vehicles.

An object of the invention is to provide a seat structure with improved means for supporting thereon a movable back and arm rest or arm rests whereby in the swinging of the back, the arm rest will be moved from one tilted position in which the seat faces one way to a tilted position in the opposite direction when the seat faces in the opposite direction. Yet another object is to provide a structure in which a seat rest is moved to a tilted position with the outer end raised when the seat back is moved to one extreme of its movement while providing means for shifting the arm rest to an inclination in the opposite direction when the seat back is moved to the opposite side of the seat. Other objects and advantages will appear as the specification proceeds.

The invention is illustrated in a single embodiment, by the accompanying drawings, in which—

Fig. 1 is a broken side view in elevation of apparatus embodying my invention, a portion of the structure being shown in section; Fig. 2, a view similar to Fig. 1 with the arm rest shown in elevated central position; Fig. 3, a view similar to Fig. 1 but showing the arm rest moved to the opposite end of the seat, the seat back having been reversed; and Fig. 4, a detail sectional view, the section being taken as indicated at line 4 of Fig. 3.

In the illustration given, 10 designates a portion of a base structure upon which is mounted a cushion seat 11.

Mounted upon the base 10 are two vertical standards 12 which extend laterally of the seat 11 and which are connected at their tops by an angle cross bar 13. The cross bar 13 is provided along its lower edge with a flange 14 extending at right angles to the main body of the bar.

Pivotally mounted upon the cross bar 13 are the links 15 and 16, each of the links being provided on one side with a laterally extending flange 17. The flange 17 is adapted to engage the lower flange 14 of cross bar 13 to provide a stop when the links 15 and 16 are swung to lowered positions.

A hollow arm rest 18 of inverted U-shape, as illustrated best in Fig. 4, is supported upon the pivotally mounted links 15 and 16. Link 15 is connected by pivot pin 19 to a wall of the arm rest 18 and similarly link 16 is connected by pivot pin 20 to the wall of the arm rest 18. In the preferred structure, I arrange the links 15 and 16 so that they extend in an angle away from the parallel position so that the arm rest 18 will occupy a tilted position in either extreme of its movement, as illustrated in Figs. 1 and 3.

A seat back 21 is pivotally mounted upon the base 10 for swinging movement first to one side of the seat 11 and then to the other as in the usual railway seat construction. The seat back is pivotally mounted upon a pivot 30 which is well below the top of the seat 11. In order to cause the arm rest to move from the one angular position shown in Fig. 1 to the angular position shown in Fig. 3, and vice versa, I equip a vertical part 22 of the frame 10 with a U-shaped strap 23, as illustrated best in Fig. 4. The strap 23 extends outwardly from the frame part 22 and is connected by means of a pivot pin 24 with an actuating link 25. The actuating link 25 is provided with a slot 26 through which extends a pivot pin 27. The pivot pin 27 is secured within a side wall of the arm rest 18 and the pin is provided with a head 28, this structure being shown best in Fig. 4. The upper portion of the seat back 21 may be provided with the usual cushion 29. It will be understood that the arm rest 18 and the supporting means therefor may be placed on only one side of the seat 11 or, if desired, on both sides.

Operation

In the operation of the apparatus, the seat back 21 is swung from a position along one side of the seat to a position on the other side of the seat, causing a tilting of the arm rest in the opposite directions shown in Figs. 1 and 3. In the starting position shown in Fig. 1, the arm rest 18 is held in an upwardly tilted or inclined position, the lower flange 17 of link 15 abutting the flange 14 of cross bar 13. The pin 27 carried by the arm rest 18 lies at the outer extreme position of the slot 26 of link 25. As the seat back 21 is swung to vertical position, as illustrated in Fig. 2, the pin 27 occupies a position at the bottom of slot 26 while the link members 15 and 16 cause the arm rest to move to raised position.

Continued movement of the back 21 brings it to the reversed position shown in Fig. 3. In this position, the link 25 is substantially horizontal and the pin 27 occupies a position in the extreme outer end of slot 26. The lower flange 17 of link 16 engages the flange 14 of cross bar 13 and supports the arm rest 18 in the tilted position shown. By having the links 15 and 16 secured to the outer wall of the U-shaped arm rest 18 and the link 25 secured to the inner wall, a strong braced structure is obtained and it will be noted in Fig. 4 that the cross bar 13 which supports the links 15 and 16 extends centrally within the cross arm 18.

The new structure with its few parts provides a sturdy support for the arm rest 18 while effectively moving it from an inclined position on one side of the seat to an inclined position on the other side when the seat back is reversed.

While in the foregoing specification, I have set forth a specific structure in considerable detail for the purpose of illustrating one embodiment of the invention, it will be understood that such details of structure may be varied widely by those skilled in the art without departing from the spirit of my invention.

I claim:

1. In a reversible seat back and arm rest structure, a base, a seat thereon, angularly related links pivotally carried by said base, an arm rest pivotally mounted upon said links, a seat back pivotally mounted upon said base and swingable to opposite sides of said seat, and link means connecting said back to said arm rest for moving said arm rest longitudinally as said back is moved.

2. In a reversible seat back and arm rest structure, a base, a seat thereon, angularly related links pivotally carried by said base, an arm rest pivotally mounted upon said links, a seat back pivotaly mounted upon said base and swingable to opposite sides of said seat, and link means connecting said back to said arm rest for moving said arm rest longitudinally as said back is moved, said angularly related links having their upper end portions occupying diverging positions.

3. In a reversible seat back and arm rest structure, a base, a seat thereon, a standard mounted on said base, link means pivotally mounted upon said standard, an arm rest pivotally supported upon said link means, a seat back pivotally mounted upon said base and swingable to opposite sides of said seat, and means connecting said back to said arm rest for moving said arm rest longitudinally as said back is moved, said last mentioned means comprising a slotted link pivotally connected at one end to one of said members and connected by a pin extending through said slot to the other of said connected members.

4. In a seat structure, a base, a seat mounted thereon, angularly related links carried by said base, an arm rest pivotally mounted upon said links, means on said base cooperating with said links for tiltably supporting said arm rest at each extreme of its movement, a seat back pivotally mounted upon said base and swingable to opposite sides of said seat, and means including a slotted link and pin connecting said back to said arm rest for moving said arm rest longitudinally as said back is moved.

5. In a reversible seat back and arm rest structure, a base, a standard mounted upon said base, a cross bar carried by said standard and equipped with a flange, a pair of links pivotally mounted upon said cross bar, each of the links being equipped with a flange adapted to engage the flange of said cross bar to support the arm rest in a tilted position when said arm rest is moved to either limit of its movement, a seat back pivotally mounted upon said base and swingable to opposite sides of said seat, and link means connecting said back to said arm rest for moving said arm rest longitudinally as said back is moved.

6. In a reversible seat back and arm rest structure, a base, a seat thereon, a standard extending vertically from said base, a cross bar mounted thereon and equipped with a flange, a pair of links pivotally mounted upon each end of said cross bar and equipped with laterally extending flanges adapted to engage the flange of said cross bar, an arm rest of inverted U cross section, said links having their outer ends pivotally secured to an interior wall of said arm rest, a U-shaped strap fixed to said base and extending inwardly of said arm rest below the bottom edge thereof, a link pivotally secured to the outer end of said strap and having its opposite end slotted, and a pin extending through said slot and secured to an inner wall of said arm rest.

7. In a reversible seat back and arm rest structure, a base, a seat thereon, a horizontal support member carried by said seat, a pair of links at the opposite ends of said support member and occupying diverging positions, an arm rest pivotally mounted to said diverging links, a seat back pivotally mounted upon said base and swingable to opposite sides of said seat, a link member pivotally secured at one end to said base and at its other end to said arm rest, said latter connection consisting of a pin extending through a slot in said link.

ROBERT LOUIS EDWARDS.

REFERENCES CITED

The following references are of record in the file of this patent:

UNITED STATES PATENTS

| Number | Name | Date |
|---|---|---|
| 566,675 | Forney | Aug. 25, 1896 |
| 1,059,246 | Wheatley | Apr. 15, 1913 |

FOREIGN PATENTS

| Number | Country | Date |
|---|---|---|
| 16,216 | Great Britain | 1906 |
| 18,309 | Great Britain | 1906 |